C. O. HARRIS.
FISHING STAFF OR CANE.
APPLICATION FILED OCT. 7, 1916.
1,258,632.
Patented Mar. 5, 1918.
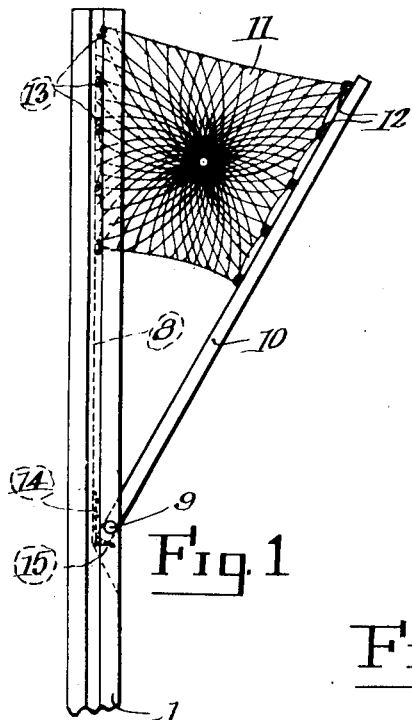
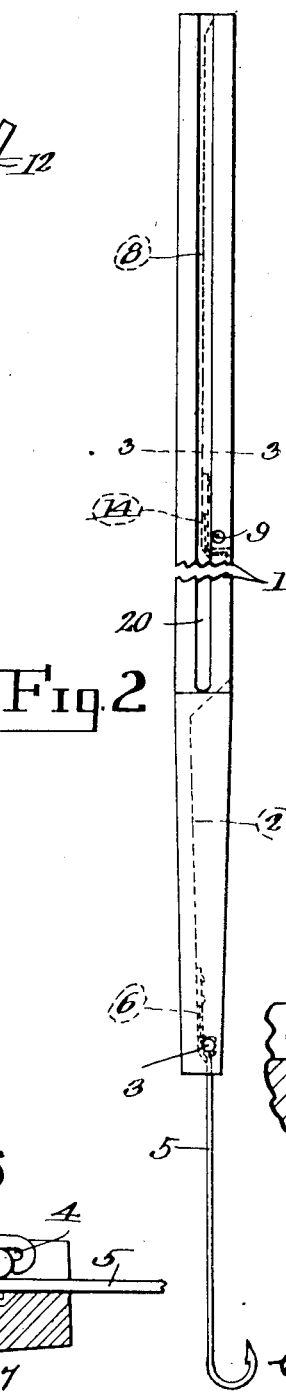
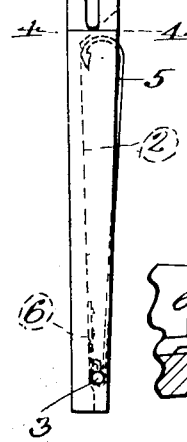
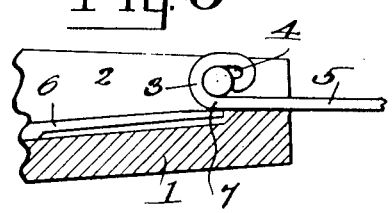
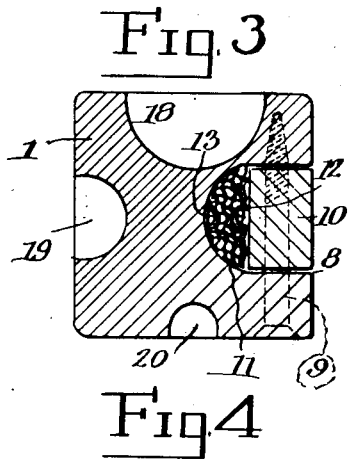
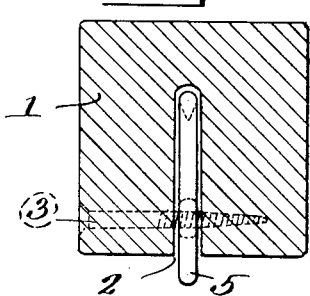
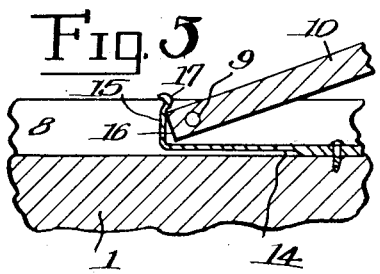
Inventor
Clinton O. Harris
By
Attorney.

UNITED STATES PATENT OFFICE.

CLINTON O. HARRIS, OF SEATTLE, WASHINGTON.

FISHING STAFF OR CANE.

1,258,632.  Specification of Letters Patent.  Patented Mar. 5, 1918.

Application filed October 7, 1916. Serial No. 124,404.

*To all whom it may concern:*

Be it known that I, CLINTON O. HARRIS, a citizen of the United States, and a resident of Seattle, in the county of King, State of Washington, have invented certain new and useful Improvements in Fishing Staffs or Canes, of which the following is a specification, to wit:

This invention relates to certain new and useful improvements in combination fishing staffs or canes, and provides a convenient and useful instrument for those who engage in the sport of fishing.

The primary object of the present invention is to provide a main member in the form of a cane and having a gaff hook foldably attached to one end thereof and a landing net foldably attached to the other end thereof.

A further object of the invention is to so construct the staff as to receive the hook and net therein when in folded position, together with means for retaining said hook and net in the folded positions thereof.

A still further object of the invention is to provide a device of the above type which shall be simple in plan of construction but durable and efficient for its purpose.

A still further object of the invention is to provide longitudinal grooves in the side faces of the staff for the reception of sections of a fishing rod which may be secured in position by any convenient means.

With the above general objects in view and others that will appear as the nature of the invention is better understood, the same consists in the novel form, arrangement and combination of parts hereinafter more fully described, shown in the accompanying drawings and claimed.

In the accompanying drawings forming a part of this application and in which like designating characters refer to corresponding parts throughout the several views.

Figure 1 is a side elevational view of a staff constructed in accordance with the present invention, a portion of the staff being broken away, the landing net being shown in extended position and the gaff hook being shown in folded position, Fig. 2 is a side elevation of a staff embodying my invention with the gaff hook in extended position and the landing net in folded position, a portion of the staff being broken away, Fig. 3 is a transverse enlarged sectional view taken on line 3—3 of Fig. 2, Fig. 4 is an enlarged transverse sectional view taken on line 4—4 of Fig. 1, Fig. 5 is an enlarged sectional detail view showing the hinged connection between the staff and the swinging arm of the landing net and Fig. 6 is an enlarged sectional detail view of the hinged connection between the staff and the gaff hook.

Referring more in detail to the several views, the invention embodies an elongated staff or cane 1 whose lower end is of tapering form and is provided with a groove 2 in one side thereof which gradually deepens from the lower end of the staff upwardly. At the lower end of the staff and extending transversely through the side walls of the recess 2 is a hinge pin or screw 3 which also extends through the eye 4 of the gaff hook 5. A spring 6 of sheet metal form is secured in any suitable manner to the bottom of the groove 2 and is arranged with its free end bearing against the eye portion of the hook 5 as at 7 to thereby yieldingly retain the hook member in its folded position as shown in Fig. 1 or in its extended position as shown in Figs. 2 and 6.

In the opposite end portion of the staff 1 and in the same face in which the groove or recess 2 is provided, a second groove 8 is formed and extending through the walls of this groove at the lower end thereof is a transverse pin or screw 9. A rod 10 is pivoted upon the pin 9 to swing inwardly and outwardly of the groove 8 and has one edge of a landing net 11 secured to the opposite end portion thereof by any suitable means such as staples 12, the opposite edge of the net being secured in the groove portion 8 of the staff by similar means such as staples 13. Secured to the bottom of the groove 8 is a sheet metal spring 14 which has its free end bent outwardly as at 15 to flatly engage the squared end 16 of the rod 10 when the latter is in folded position within the groove 8 and said spring 14 is further provided with an inwardly curved or bent end portion 17 to engage the rod 10 and hold the same in unfolded position.

The remaining three side faces of the staff 1 are provided respectively with longitudinal grooves 18, 19 and 20 which are of varying cross sectional areas and are adapted to receive the sections of a fishing rod, the said sections being adapted to be secured within the grooves by any suitable means such as a piece of cord wrapped around the staff and also encompassing the rod sections.

It will be readily seen, in view of the foregoing description when taken in connection with the drawing, that the hook 5 and net 11 may be swung into their respective slots and the staff 1 thereby used as a cane, while the net 11 is effectively concealed in the groove 8 by the rod 10, and the hook 5 may be readily grasped and drawn out of its groove to extended position in longitudinal alinement with the staff.

The foregoing described construction is an extremely useful combination implement for persons engaged in fishing as it provides a cane, a hook to haul in the fish which have been caught by a fishing line and a net for the purpose of hauling in or landing the fish that may be caught with the hook, while convenient means is presented for the purpose of receiving the several sections of a fishing rod when the same are not in use.

It is believed that the construction and operation of the device will be readily apparent to those skilled in the art from the foregoing description and while the form of the invention herein described is what is believed to be the preferred embodiment thereof, minor changes may be made in the form, combination and arrangement of parts without departing from the spirit and scope of the invention as claimed.

What I claim as new is:—

1. In a device of the class described, the combination with a staff having a longitudinal groove in one side face thereof, of a rod having one end hingedly connected to said staff within one end portion of said groove and a landing net secured to the opposite end of said rod and to said staff within the groove thereof.

2. A device of the class described including a staff having a longitudinal groove in one side face thereof and a landing net foldable into said groove.

3. A device of the class described including a staff having a longitudinal groove in one side face thereof, a landing net foldable into said groove, and means to retain said net in extended position and in folded position within the groove.

4. A device of the class described including a staff having a longitudinal groove in one end portion thereof, a hook foldable within said groove, a second groove provided longitudinally of the opposite end portion of said staff and a landing net foldable within the second groove.

5. A device of the class described including a staff having a longitudinal groove in one end portion thereof, a hook foldable within said groove, a second groove provided longitudinally of the opposite end portion of said staff, a landing net foldable within the second groove, and a plurality of longitudinal grooves of varying cross sectional area provided in the side faces of said staff adapted to receive sections of a fishing pole.

6. A device of the class described including a staff having a longitudinal groove in one side face thereof, a landing net having one edge secured to said staff within said groove, a rod having the opposite edge of said net secured thereto and hingedly connected to said staff within said groove, and means for yieldingly retaining said rod in folded position within said groove.

Dated at Seattle, Washington, this 1st day of September A. D. 1916.

CLINTON O. HARRIS.

Signed in the presence of
W. W. EWART,
C. E. CUSHING